United States Patent
Chatwin et al.

(10) Patent No.: US 8,296,176 B1
(45) Date of Patent: Oct. 23, 2012

(54) MATCHING VISITORS AS LEADS TO LEAD BUYERS

(75) Inventors: Richard Edward Chatwin, Sunnyvale, CA (US); Steve Na, San Mateo, CA (US)

(73) Assignee: Adchemy, Inc., Foster City, CA (US)

( * ) Notice: Subject to any disclaimer, the term of this patent is extended or adjusted under 35 U.S.C. 154(b) by 381 days.

(21) Appl. No.: 12/688,184

(22) Filed: Jan. 15, 2010

(51) Int. Cl.
G06Q 10/00 (2012.01)

(52) U.S. Cl. ...................................................... 705/7.29
(58) Field of Classification Search .................... None
See application file for complete search history.

(56) References Cited

U.S. PATENT DOCUMENTS

| | | | |
|---|---|---|---|
| 2005/0044036 A1* | 2/2005 | Harrington et al. | 705/38 |
| 2007/0112582 A1* | 5/2007 | Fenlon | 705/1 |
| 2007/0233559 A1* | 10/2007 | Golec | 705/14 |
| 2007/0239514 A1* | 10/2007 | Lissy et al. | 705/10 |
| 2008/0189199 A1* | 8/2008 | Sarid et al. | 705/37 |
| 2008/0201184 A1* | 8/2008 | Rose et al. | 705/7 |
| 2008/0208651 A1* | 8/2008 | Johnston et al. | 705/7 |
| 2008/0313018 A1* | 12/2008 | Kamm et al. | 705/10 |
| 2009/0018894 A1* | 1/2009 | Zamani et al. | 705/10 |
| 2009/0037356 A1* | 2/2009 | Rothstein et al. | 706/46 |
| 2009/0048859 A1* | 2/2009 | McCarthy et al. | 705/1 |
| 2009/0287592 A1* | 11/2009 | Brooks et al. | 705/35 |
| 2009/0299825 A1* | 12/2009 | Olawski et al. | 705/10 |
| 2010/0131835 A1* | 5/2010 | Kumar et al. | 715/205 |
| 2010/0324965 A1* | 12/2010 | Croix et al. | 705/9 |
| 2010/0332290 A1* | 12/2010 | Narvaez et al. | 705/10 |

OTHER PUBLICATIONS

Ramakrishnan et al., "automatic sales lead generation from web data," IEEE, Computer society, Proceedings of the 22$^{nd}$ international conference on Data engineering, 2006.*

* cited by examiner

*Primary Examiner* — Jonathan G Sterrett
*Assistant Examiner* — Tzu-Hsiang Lan
(74) *Attorney, Agent, or Firm* — Baker Botts L.L.P.

(57) ABSTRACT

In one embodiment, a method includes accessing information regarding a visitor to a website; accessing a plurality of filters that are each associated with one of a plurality of lead buyers and being defined by a set of lead criteria specified by the associated lead buyer; and, for each of the filters, determining whether the information regarding the visitor satisfies the set of lead criteria defining the filter and, if the information regarding the visitor satisfies the set of lead criteria defining the filter, selecting the filter as a filter for which the visitor qualifies as a lead. The method includes, for each of the filters for which the visitor qualifies as a lead, accessing information indicating a potential revenue to be obtained by a lead matcher from the lead buyer associated with the filter.

37 Claims, 2 Drawing Sheets

MATCHING VISITORS AS LEADS TO LEAD BUYERS

TECHNICAL FIELD

The present disclosure generally relates to matching leads generated via online advertising to lead buyers.

BACKGROUND

Online advertising uses the Internet to deliver marketing messages to Internet visitors. Online advertising business continuously grows with the development of network technologies and the popularization of the Internet. There are various aspects to online advertising, one of which is lead generation. With lead generation, a lead seller may advertise online, often through multiple channels, in order to drive visitor traffic to specific landing pages. Each landing page may enable an Internet visitor to provide some relevant information. Based on the information provided by the visitors, the lead seller may determine whether a visitor qualifies as a lead for some of its clients (the lead buyers), and if so, the lead seller may forward the visitor's information to the specific lead buyers. The visitor thus becomes a lead for these lead buyers.

DESCRIPTION OF EXAMPLE EMBODIMENTS

Lead generation may be considered one aspect of online advertising. In such cases, lead sellers usually advertise on the Internet to various Internet visitors in the hope of directing some of these Internet visitors to specific landing pages. For example, a lead seller may present an advertisement concerning a particular product or service as a part of a web page to an Internet visitor. If the visitor clicks on the advertisement because, for example, the visitor is interested in the product or service being advertised, the visitor may be directed to a landing page (e.g., in the form of another web page) associated with the advertisement. The landing page may ask the visitor to provide certain pieces of information, such as information as to the visitor's qualification and interests regarding the product or service advertised in the advertisement, together with the visitor's contact information. For example, the landing page may contain one or more forms, and each form may ask certain specific questions to which the visitor may provide answers. The visitor may submit the information to the lead seller via the landing page. For example, once the visitor has completely answered all the questions presented in the forms, the visitor may click a "submit" button to submit the forms. Based on the information provided by the visitor, the lead seller may determine whether the visitor qualifies as a lead for one or more lead buyers, and if so, the visitor may become a "lead" for these lead buyers. In this context, a lead may be a person that may become a customer of a lead buyer and may purchase a service or product from the lead buyer. The lead seller may forward the visitor's information to these lead buyers. In this sense, the lead sellers may act as "intermediaries" between the visitors who may become leads and the lead buyers.

Figure 1:
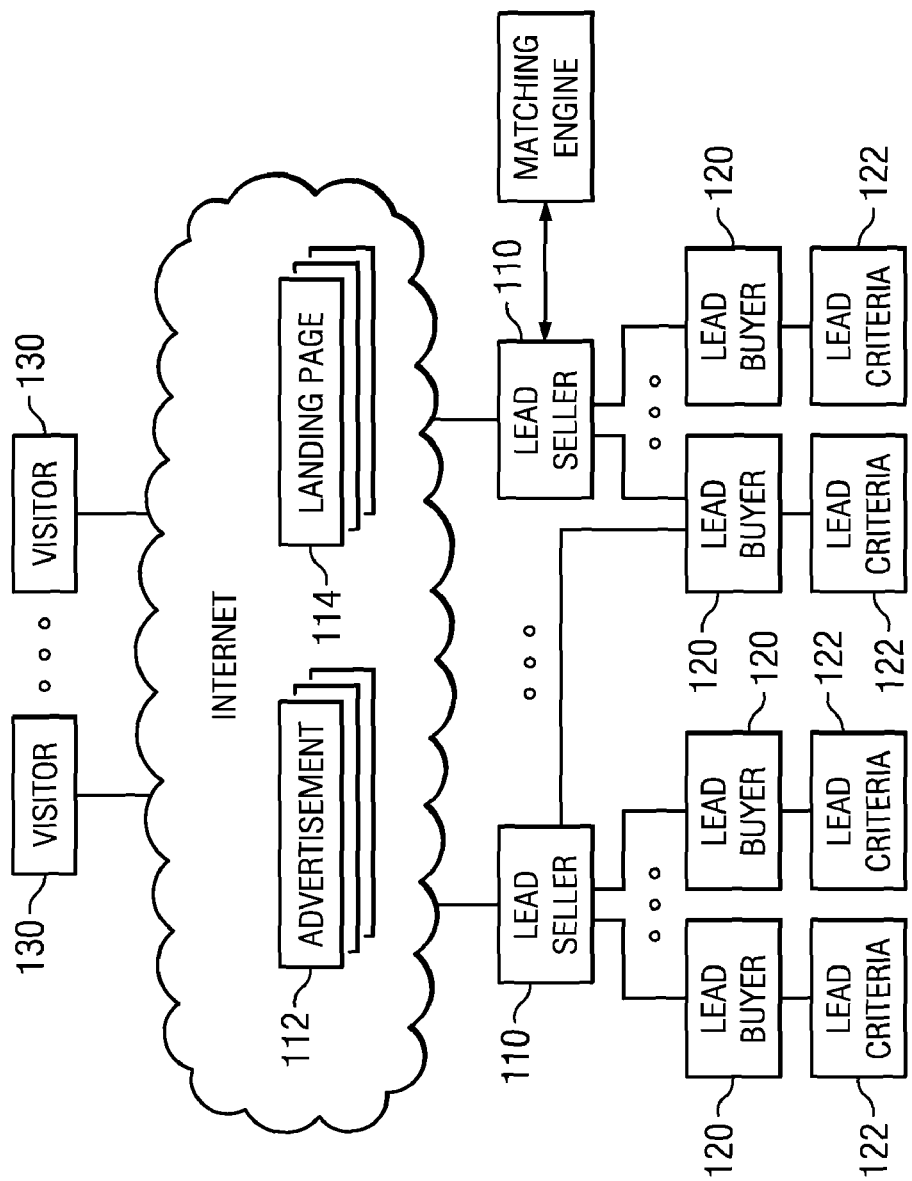
FIG. 1 illustrates example relationships among example parties involved in lead generation.

FIG. 1 illustrates example relationships among example parties involved in lead generation. A lead seller 110 may have one or more clients who are the lead buyers 120. A lead buyer 120 may receive lead information from one or more lead sellers 110. Each lead buyer 120 may specify a set of lead criteria 122 indicating the type of people it is willing to accept as leads. Each lead seller 110 may advertise to one or more visitors 130 on the Internet in order to direct some of visitors 130 to specific landing pages 114 associated with the advertisements 112 presented to visitors 130. A landing page 114 may ask for and enable a visitor 130 to provide specific pieces of information (e.g., information concerning the visitor 130 or relating to the visitor's 130 interests in the product or service advertised in the corresponding advertisement 112). For example, a landing page 114 may include specific questions to which the visitor 130 is asked to provide answers.

A lead seller 110, upon receiving the information provided by a particular visitor 130, may compare the visitor 130 and the information provided by the visitor 130 against each set of lead criteria 122 specified by each lead buyer 120 to determine whether the visitor 130 qualifies as a lead for any of lead buyers 120. If the visitor 130 qualifies as a lead for a particular lead buyer 120, then the lead seller 110 may forward the visitor's 130 information to that lead buyer 120. In this case, this particular visitor 130 may become a lead for this particular lead buyer 120. Sometimes, a visitor 130 may become a lead for multiple lead buyers 120 (e.g., four or five) as the same visitor 130 may satisfy multiple sets of lead criteria 122 specified by these lead buyers 120, in which case the same visitor's 130 information may be forwarded to multiple lead buyers 120. Each lead buyer 120 may further interact with the leads it receives from a lead seller 110, such as conducting business negotiations and transactions.

Lead buyers 120 may pay a lead seller 110 for the leads they receive from the lead seller 110. The payment may be based on contractual agreements previously agreed between the lead seller 110 and each lead buyer 120 and may depend on the lead criteria 122 specified by the lead buyer 120. In particular embodiments, the lead seller 110 may employ alternative matching strategies when matching visitors as leads to lead buyers 120. In particular embodiments, the matching strategies may be implemented as computer software or hardware using a matching engine. In particular embodiments, the matching engine may match specific visitors to specific lead buyers 120 based on the information provided by the visitors and the lead criteria 122 specified by the lead buyers 120 as well as considering the various matching strategies employed by the lead seller 110.

In particular embodiments, a lead buyer may specify the type of leads with whom it is willing to be matched and for whom it is willing to pay (e.g., via one or more specific lead criteria). For example, a mortgage loan lead buyer may specify that it is only willing to pay for leads that have credit rating above a certain level, have annual income above a certain level, own properties valued above a certain level, are located in certain states, etc. In particular embodiments, the lead criteria specified by the lead buyers may influence the number and the types of questions presented to the visitors in the landing pages so that the matching engine may be able to determine whether a visitor satisfies the lead criteria specified by a lead buyer based on the answers provided by the visitor. In the example of the mortgage loan lead buyer, a landing page designed to generate leads for such a mortgage loan lead buyer may ask the visitors to provide their credit ratings, annual income, property values, etc.

In particular embodiments, the lead seller may specify a lead buyer's desired lead criteria to the matching engine through one or more filters. In particular embodiments, a filter may have a set of rules defining the attributes that a visitor must possess in order to be matched to the filter and with the corresponding lead buyer and become a lead for the lead buyer. In particular embodiments, the attributes may describe various aspects or characteristics of the lead and may be defined in terms of the information provided by a visitor via a landing page (e.g., the answers provided by the visitor to the questions presented in the landing page, etc.), the information concerning a visitor (e.g., a visitor's demographic information, etc.), the information extracted from monitoring and tracking the online activities of a visitor (e.g., the search query issued by the visitor, the web page clicked by the visitor, the device used by the visitor when visiting the Internet, etc.), the information concerning the advertisement or the landing page presented to the visitor (e.g., the product or service being advertised, the content of the web page containing the advertisement, the placement of the advertisement in the web page, the time of day or day of week when the visitor has seen the advertisement or submitted the information via the landing page, etc.), the visitor's behavioral information, etc. The present disclosure contemplates any suitable attributes that may be used to define lead criteria desired or specified by a lead buyer. Sometimes, two filters may have overlapping attributes (e.g., two filters may share a portion of the attributes defined therein). In particular embodiments, a filter may have an associated revenue value that represents the revenue the corresponding lead buyer will pay for receiving a lead matching to the filter (e.g., the cost of a lead to the lead buyer).

In particular embodiments, a lead seller may provide an interface, such as, for example and without limitation, a web-based interface, through which a lead buyer may specify its desired lead criteria. One or more computer systems may translate the lead buyer's desired lead criteria as entered through the interface into one or more filters that may be made accessible to the lead seller's matching engine.

Figure 2:
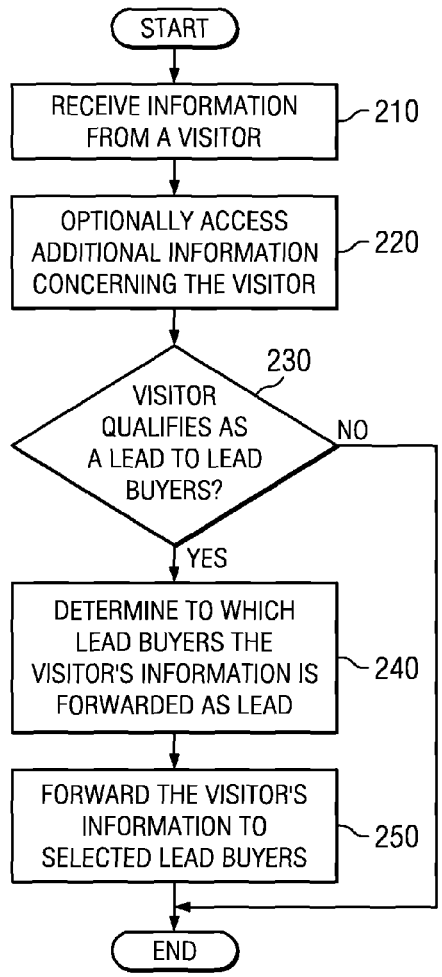
FIG. 2 illustrates an example method of matching visitors as leads to lead buyers.

In particular embodiments, a lead seller, or more specifically, a matching engine associated with the lead seller, may match specific visitors to individual lead buyers as leads by comparing the visitors against the filters describing the lead buyers' desired criteria. FIG. 2 illustrates an example method of matching visitors as leads to lead buyers from a matching engine's point of view.

In particular embodiments, a matching engine associated with a lead seller may receive information from a visitor, such as information provided by the visitor via a landing page presented to the visitor, as illustrated in step 210. In addition, in particular embodiments, the matching engine may optionally access additional information concerning the visitor, as illustrated in step 220. The additional information may be from other sources available to the matching engine. For example, each Internet visitor may be associated with a visitor profile, also referred to as a "visitor context", which may be accessible to the matching engine. A visitor context associated with a visitor may include information concerning the visitor, such as the visitor's demographic information, interests, hobbies, family background, etc. The information contained in a visitor context may be provided by the associated visitor or may be derived from the visitor's online activities. The matching engine may access the advertisement presented to the visitor, which has led the visitor to the landing page through which the visitor has provided certain pieces of information. In particular embodiments, the matching engine may access any available information (e.g., information concerning the visitor, related to the visitor, or provided by the visitor, etc.) as needed in order to determine whether the visitor may qualify as a lead for one or more lead buyers, as illustrated in step 230.

In particular embodiments, when determining whether the visitor qualifies as a lead, the matching engine may compare the visitor against the filters describing the individual lead buyers' desired criteria. More specifically, the matching engine may compare the information provided by the visitor as well as the information concerning or relating to the visitor retrieved by the matching engine, which may include the information extracted from the visitor context associated with the visitor, from the visitor's online activities, from the visitor's public profiles accessible to the matching engine, from the answers provide by the visitor via the form contained in a landing page, etc. to the attributes specified in the filters. If the visitor satisfies a particular filter (e.g., the visitor possesses all the attributes defined by the filter), then the matching engine may consider the visitor matches that filter and is eligible to become a lead to the lead buyer associated with that filter (step 230, "YES"). On the other hand, if the visitor does not satisfy any filter, then the visitor does not become a lead for any lead buyer (step 230, "NO").

In particular embodiments, the matching engine does not necessarily send the visitor's information to every lead buyer having at least a filter matched to the visitor. For example, suppose a visitor is matched to eight filters of eight different lead buyers. The matching engine may send the visitor's information to all eight lead buyers or may only send the visitor's information to three or four of the eight lead buyers. How many lead buyers to whom a visitor's information is sent at the same time may depend on the business industries to which these lead buyers belong. Each business industry may be referred to as a "vertical". For example, with the online education vertical, a visitor may be sent to at most five schools (lead buyers) at a time. With the mortgage vertical, a visitor may be sent to at most three or four mortgage loan companies (lead buyers) at a time. In this sense, the matching engine may perform a two-step lead-matching process. First, the eligibility of a visitor as a lead is determined by comparing the visitor to the different filters. And second, once the visitor is matched to a number of filters, that is, the visitor satisfies the lead criteria specified in these filters (step 230, "YES"), the matching engine selects some or all of the lead buyers having the matched filters to whom the visitor's information is sent.

In particular embodiments, once it has been determined that the visitor qualifies as a potential lead for one or more lead buyers, that is, the visitor has been matched as a potential lead to one or more lead buyers, the matching engine may further determine to which of the matched lead buyers to send the potential lead's (the visitor's) information, as illustrated in step 240.

In particular embodiments, the actual lead matching process (e.g., determining to which of the matched lead buyers to send the potential lead's information as a lead) may vary by business industries (verticals) because each business industry may have different business requirements. For example, in the mortgage vertical the process is fairly straightforward. A visitor (e.g., a potential mortgagor) may complete a form provided in a landing page to provide the information the lead buyers (e.g., the potential mortgagees or the mortgage companies) may need to evaluate the visitor as a potential mortgagor. The matching engine matches the visitor to one or more lead buyers and sends the information concerning the visitors to the matched lead buyers. The visitor may be informed with which mortgage companies he has been matched and to expect to be contacted by those mortgage companies in the near future.

In the education vertical, again, a visitor may complete a form provided in a landing page to provide information such as in what degree and major he is interested, what education background he currently has, etc. The matching engine matches the visitor to a number of schools (lead buyers) offering the education programs in which the visitor is interested (e.g., up to five schools). The matched schools and programs are then presented to the visitor. The visitor may select at most one program for each of the matched schools. The visitor's information, including the relevant selected program, is then sent as a lead to the selected schools. In this particular case, there is a visitor-selection step (selecting the schools and programs) involved in the lead matching process.

In the auto insurance vertical the filter values may not be pre-populated. Instead, after a visitor completes a form provided in a landing page, his attribute information (but not the visitor's contact information) is sent by the matching engine to all insurers for whom the visitor matches to one or more of their filters. These insurers may respond with a federated bid, specific to that visitor, resulting in the filter value to be provided in real-time. The matching engine may then decide to which insurers to match the visitor as a lead (equivalently, accept which insurers' bids).

Although in practice, most of the leads are selected from visitors who have submitted forms contained in instances of landing pages because the answers provided by the visitors via these forms help determine whether the visitors satisfy the lead criteria, it is not absolutely necessary that a visitor must submit a form in order to be selected as a lead. In some situations, it is possible to match a visitor to a filter based on information of the visitor obtained from other sources, such as the visitor context associated with the visitor or the visitor's online activities.

Sometimes, certain lead buyers may impose limits (caps) on the number of leads they are willing to buy from a lead seller or on the amount of money they are willing to spend on buying leads from a lead seller. In particular embodiments, a lead buyer may impose caps at the individual filter level or across groups of filters (e.g., at the most aggregate level across all of a lead buyer's filters). The caps may apply across a defined time period. For example, in the mortgage vertical, the caps are typically applied on a daily basis, and in the education vertical, the caps are typically applied to a calendar month.

In particular embodiments, when a cap is hit (e.g., the number of leads specified by the cap have been sent to the lead buyer), any filter to which the cap applies will no longer be eligible to be matched to a visitor by the matching engine.

In particular embodiments, a challenge faced by the matching engine at the highest level when making matching decisions (e.g., matching potential leads to lead buyers) is to maximize the long-term profits generated for a lead seller. Particular embodiments may break this broad problem down to several sub-problems. In particular embodiments, there may be three types of decision or information that the matching engine may provide to improve on a lead seller's profit margin.

In particular embodiments, first, the matching engine may match visitor form submissions to lead-buyer filters. The objectives here are to maximize short-term, medium-term, and long-term revenue or profit for the lead seller or the lead buyers. In this context, the short-term revenue refers to the immediate revenue obtained from the match; the medium-term revenue refers to net revenue over the timeframe of any lead buyer caps; and the long-term revenue refers to net revenue over timeframes of greater than that defined by any lead buyer caps. Second, the matching engine may provide information on how to target advertising, on what media to advertise, how much volume to obtain, how to price the inventory, or how much to bid for the inventory. The goals here are to manage the mix of visitors and ultimately, the visitor form submissions so as to best leverage the lead buyers' filters and caps that are available to the lead seller. Third, the matching engine may provide information as to how to adapt lead buyer filters, either by changing the eligibility requirements or by changing the price, so as to best leverage the visitor mix and ultimately, the visitor form submissions being generated through the media advertising, and so as to grow lead buyers' budgets.

In particular embodiments, to maximize short-term revenue for a lead seller, the matching engine may simply select among the eligible lead-buyer filters the ones with the highest filter values. Hereafter, let v denote the filter value of a lead-buyer filter. For example, suppose a visitor is matched to six different filters, and more specifically, the visitor satisfies the attributes defined in the six filters, of six lead buyers. In theory, the visitor may become a lead to any of these six lead buyers. Further suppose that the filter values of the six filters (the amount the lead buyer is willing for pay for a lead) are $3.50, $3.50, $3.30, $2.20, $1.60, and $1.30 respectively. Based on the different filter values of the six filters, the matching engine may choose to send the visitor's information only to the three lead buyers associated with the first three filters having the higher filter values ($3.50, $3.50, $3.30). This matching method may be referred to as the "short-term gross revenue" method, which only takes into consideration the filter values of the filters matched to a visitor when selecting to which lead buyers having the matched filter to send the visitor's information (to send the visitor as a lead).

With certain business industries (e.g., the online education vertical), a visitor may be matched to multiple filters of a lead buyer. When selecting the lead buyers having the matched filters, if a visitor matches to multiple filters of a lead buyer, particular embodiments may consider the matched filters of the lead buyer having the highest filter value or may average the filter values of the matched filters of the lead buyer when comparing this lead buyer with the other lead buyers also having the matched filters.

However, matching visitors to lead buyers based solely on the filter values may not generate the maximum short-term profit for a lead seller because the filter values do not reflect accurately the revenue that a lead seller receives. This may be the case, for example, when there is a visitor-selection step involved in the lead matching process. Revenue is generated for the lead seller when a lead is sent to a lead buyer, which requires first, that a visitor be matched to a lead-buyer filter, and second, that the visitor select that filter. One factor that may affect the revenue received by a lead seller is the "match-sent ratio" for a lead-buyer filter, hereafter denoted by m, which represents the proportion of the visitors matched to that filter who select that filter and are actually sent as leads to the lead buyer associated with that filter. Typically, those filters having higher match-sent ratios generate more revenue for a lead seller than those filters with lower match-sent ratios (modulo differing filter values).

Another factor that may affect the revenue received by a lead seller is the number of the leads sent to a lead buyer that are rejected by the lead buyer. When a lead is sent to a lead buyer, sometimes the lead is immediately rejected because it does not meet the lead buyer's agreed-upon lead criteria or because the lead is a duplicate for the lead buyer. Hereafter, let s denotes the reject-lead rate for a lead-buyer filter, which represents the proportion of sent leads for that filter that are immediately rejected.

A third factor that may affect the revenue received by a lead seller is the number of the leads sent to a lead buyer that are eventually returned by the lead buyer. When a lead is sent to a lead buyer, even if the lead is initially accepted by the lead buyer, it may subsequently be returned because the lead buyer is unable to contact the lead or because the lead is a duplicate for the lead buyer. Some lead buyers are much more aggressive about returning leads than others. Hereafter, let t denote the return-lead rate for a lead-buyer filter, which represents the proportion of non-rejected leads for that filter that are returned.

Particular embodiments may improve on the simple version of the "short-term gross revenue" matching method by accounting for the differences in match-sent ratios, rejected leads, and returned leads between the filters by matching visitors to filters on the basis of net revenue instead of on the basis of gross revenue. In particular embodiments, the net revenue may be computed as: $R=m \times (1-s) \times (1-t) \times v$, where v denotes the filter value of a lead-buyer filter. This matching method may be referred to as the "short-term net revenue" matching method. In particular embodiments, a major challenge in implementing the short-term net revenue matching method is in appropriately estimating m, s and t for each lead-buyer filter.

Particular embodiments may estimate the match-sent ratio, the reject-lead rate, and the return-lead rate for each lead-buyer filter based on one or more statistical models trained with relevant training data. Further more, particular embodiments may estimate the match-sent ratio, the reject-lead rate, and the return-lead rate for each lead-buyer filter differently for each different business industry. Using the education vertical as an example, based on a visitor's answers to the form questions, the matching engine may identify the eligible filters (e.g., the eligible school-program pairs) that match what the visitor is seeking. For example, if the visitor has indicated that he is interested in obtaining an MBA degree from a university located in Northern California, the matching engine may identify those filters from universities located in Northern California that offer MBA programs.

In particular embodiments, the matching engine may give each school-program pair a score. In particular embodiments, with the short-term gross revenue matching method, the score equals the filter value; and with the short-term net revenue matching method, the score equals the estimated filter net revenue. In particular embodiments, the scores for all the matching programs for a school are averaged to compute a score for the school. In particular embodiments, the averaged score for the school is an un-weighted average of the scores for all the matching programs for the school. In particular embodiments, if there are more than a predetermined number (e.g., five) schools that matched to the visitor, only the five schools with the highest average scores are displayed. In particular embodiments, the top-scored schools may be displayed in order of decreasing scores. Each of the top-scored schools may be displayed with an accompanying drop-down box listing some or all of the eligible programs for the visitor. The visitor may then select at most one program for each matched school.

To estimate the match-sent ratios for the filters, particular embodiments may collect a training data set, typically representing the most recent one-, two-, three- or six-month period. Each entry in the training data set may represent a visitor who was matched to one or more schools, the set of schools and programs to which the visitor was matched, and the set of schools and programs that the visitor selected.

One method for estimating the match-sent ratio for a filter may be to divide the counts in the training data of the number of times the filter has been selected by the number of times the filter has been matched. However, there may be two drawbacks with this approach: (i) many filters are rare so that the counts in the training data are small; as a result, the estimate of the match-sent ratio may be very poor; and (ii) each matched filter is not selected by the visitor in isolation. The decision of the visitor as to whether to select a matched filter is likely dependent on the alternative matched filters displayed. That is, the visitor typically does not independently decide to select a particular filter or not to select a particular filter. Instead, for each matched school, the visitor usually decides to select one filter among the displayed filters and the option of not making a selection. Further, the selection decision for a given matched school may be influenced by the other displayed schools and programs.

In particular embodiments, the first drawback may be overcome by using a Bayesian credibility or hierarchical Bayes approach, and the second drawback may be overcome by employing a discrete choice model. As an example, a hierarchical Bayes model for estimating match-sent ratios for a family of filters may assume that the match-sent ratios of all the filters in the family are drawn from a common prior distribution. In particular embodiments, the hierarchical Bayes model may be a beta-binomial model, as described for example in "Bayes and Empirical Bayes Methods for Data Analysis" by Carlin and Louis. Under such a model, the likelihood of y out of n visitors who are presented with a given filter f selecting that filter is assumed to be distributed according to a Binomial distribution with unknown parameter $\theta_f$ specific to the filter. Each filter-specific parameter $\theta_f$ is assumed to be drawn from a Beta prior distribution with hyperparameters a and b. Given a set of observations (where an observation describes the set of filters presented to a visitor and the filters selected by that visitor), the filter-specific parameters $\{\theta_f\}$ and the common hyperparameters a and b may be estimated using standard techniques such as the empirical Bayes approach or Markov chain Monte Carlo simulation. This approach overcomes the difficulties in estimating match-sent ratios for filters presented infrequently by assuming as a starting point that visitors' responses to all filters are essentially similar, thereby allowing estimation of match-sent ratios to be based on the observations for all the filters in the family, rather than the individual filter in isolation. Discrete choice models are statistical procedures that describe choices made by people among a finite set of alternatives. Discrete choice modeling posits that the visitor filter selection decision is predicated on an underlying rational decision process and that this process has a functional form. A specific functional form may be selected as a candidate to model the decision process. The multinomial logit model form is commonly used as it is a good approximation to the economic principle of utility maximization. The parameters of a specific model may be estimated from available data using standard techniques such as multiple regression. A discrete choice model captures the externalities that inclusion of a given filter in the consideration set presented to a visitor imposes on the other filters in the consideration set. In this way more accurate estimates of filter match-sent ratios may be obtained by accounting for the influence of all the filters that were presented to a visitor on the visitor's selection decision.

Particular embodiments may estimate the reject-lead rates and the return-lead rates using one or more feature-based statistical models such as, without limitation, logistic regression with or without regularization, decision trees with or without boosting, etc. The features to these models may be filter descriptors. Particular embodiments may employ a Bayesian credibility or hierarchical Bayes approach when necessary.

Sometimes, a particular lead buyer may specify caps on the leads (the maximum number of leads) it is willing to buy over a period of time. Particular embodiments may further improve the matching method by accounting for the caps specified by the lead buyers in the matching decision, especially when the lead-buyer caps are likely to be hit. By considering the lead-buyer caps, particular embodiments may maximize the medium-term revenue for a lead seller.

For example, consider a scenario in which a visitor matches to two filters of two different lead buyers, both filters having predetermined caps. One filter has higher filter value, is frequently matched to various visitors, and is likely to hit its cap. The other filter has lower filter value, is rarely matched, and is unlikely to hit its cap. A matching decision based solely on short-term revenue (only taking into consideration of filter values) may match the visitor to the higher-value filter. However, a matching decision that accounts for the filter caps is more likely to match the visitor to the lower-value filter on the basis that future visitors are more likely match to the higher-value filter but not to the lower-value filter. Formalizing this decision-making may require either some algorithm that is robust against the order in which different types of visitors arrive (here, visitors are distinguished by the filters to which they match) or a reliable way to estimate visitor volumes so that the matching engine may judge how likely each filter is to meet its cap at each decision point.

In particular embodiments, such a problem may be analogous to the matching problems faced by online search engines when matching search queries to advertisers who have budgets. When a network user issues a search query to a search engine, the search engine may match the search query to keywords associated with advertisements in order to determine which specific advertisement to present to the network user. The advertisers may have predetermined budgets that pay for the advertisements. In this case, the network user may be analogous to the visitor; the keywords may be analogous to the filters; and the advertising budgets may be analogous to the caps.

Particular embodiments may utilize algorithms proposed for the search-engine context in the literature. For example, an algorithm that is robust against the order in which different types of visitors arrive is given in *AdWords and Generalized On-line Matching*, by Mehta et al., *Proceedings of the Foundation of Computer Science,* 2005. Alternatively, if accurate estimates of visitor volumes over the cap period are available, the optimal matching given these volumes may be computed by solving a linear program. In practice, however, any such estimates are likely to be not entirely accurate, which may lead to poor performance of the matching decisions from the linear program. To mitigate this issue, particular embodiments may employ the algorithm described in *Allocating Online Advertisement Space with Unreliable Estimates*, by Mandian et al., *EC'07,* 2007, which takes advantage of the given estimates of the visitor volumes to compute a near optimal solution when the estimates are accurate, while at the same time maintaining a good worst-case competitive ratio in case the estimates are totally incorrect.

Particular embodiments may estimate volumes of the visitors or the forms submitted by the visitors using feature-based techniques (e.g., polynomial or log-log regression, with or without regularization, decision trees, with or without boosting, etc.). The features of the statistical models may include filter descriptors and other visitor identifiers. Particular embodiments may employ a Bayesian credibility or hierarchical Bayes approach when necessary, such as described in Alan L. Montgomery (1997), "Hierarchical Bayes Models for Micro-Marketing Strategies," Constantine Gatsonis et. al (eds.), Case Studies in Bayesian Statistics, Springer-Verlag: New York, 95-141.

Based on the results of the statistical analysis, particular embodiments may alert the lead seller if certain filters are approaching their caps too slowly or too quickly so that the matching engine may be adjusted accordingly. For example, if a filter is hitting its cap slower than average, the lead seller may negotiate with the lead buyer to relax the filter matching criteria or to increase the price per lead (the filter value), or the lead seller may increase the filter value absent a change in price per lead paid by the lead buyer (if the lead seller deems it important to its business relationship with the lead buyer that it deliver a number of leads commensurate with the filter cap value). Conversely, if a filter is hitting its cap faster than average, the lead seller may negotiate with the lead buyer to increase the cap, or the lead seller may decrease the filter value absent a change in price per lead paid by the lead buyer (if the lead seller deems it important to its business relationship with the lead buyer that it deliver the leads evenly over the lifetime of the filter cap).

In addition, particular embodiments may recommend to the lead seller for which lead buyers and filters they should try to increase capacity (e.g., those for which the lead seller may receive the most utility from more cap given the current level and mix of forms).

In particular embodiments, for some business industries, a visitor may be matched to multiple aspects of a lead buyer, such as the lead buyer itself and a particular product or service offered by the lead buyer. As a result, the matching engine may need to make a multi-stage matching decision. For example, with the online education vertical, each visitor is presented with a list of schools and for each of the schools presented, the visitor is presented with a list of eligible degree programs offered by that school (e.g., using a drop-down box). The visitor is asked to first select a school, and then select a program offered by that school. In this particular situation, the matching engine may effectively make a two-stage matching decision. First, for each school presented to the visitor, the matching engine may need to select the list of programs to be presented to the visitor. Particular embodiments may present the list of all eligible programs offered by the school based on the filter rules. Alternatively, some eligible programs, although offered by the school, may not be presented to the visitors so as to direct the visitors toward selecting programs with higher values, higher match-sent ratios, lower reject-lead rates, lower return-lead rates, higher cap availability, or higher likelihood to convert for the school. Once the list of programs has been selected for each school, the set of schools to display may then be selected, with the short-term net revenue for each school computed as the average of the short-term net revenues of all the programs in the list.

Lead buyers often select lead sellers from whom they buy leads based on the quality of the leads they receive from each lead seller. In particular embodiments, the quality of the leads a lead buyer receives may be measured as the average revenue generated per lead for the lead buyer, or the rate at which the leads convert into success events for the lead buyer (e.g., enrolled students for a school, funded loans for a mortgage lender), or the effective cost per success event incurred by the lead buyer. Particular embodiments may maximize the long-term revenue for a lead seller by causing its lead buyers to increase (grow) their lead-buying budgets with the lead seller over time. In order to achieve this objective, the lead seller may need to consistently meet or exceed its lead buyers' lead-quality targets or expectations, since a satisfied lead buyer is more likely to buy more leads from the lead seller.

In particular embodiments, a lead seller may ask its lead buyers to provide feedback on the leads they receive from the lead seller, and more specifically to provide feedback on the quality of the leads they receive, such as how many leads eventually convert for the lead buyers, how soon the conversions occur after the lead buyers contact the leads, etc. Particular embodiments may collect and analyze the feedback on the leads provided by the lead seller and integrate the results of the analysis into the matching decision process so as to adjust the mix of leads sent to each lead buyer in favor of higher-quality leads for that lead buyer. In particular embodiments, the lead feedback analysis may result in some measurements (e.g., metrics) of the lead quality associated with the visitors, which then may be used to adjust the lead matching process. For example, the lead quality may be represented as an additional variable or coefficient in the equation used to calculate the revenue.

In particular embodiments, the results of the lead feedback analysis may help identify visitor attributes that correlate with higher-quality leads for particular lead buyers. At the time of matching visitors with lead buyers, in particular embodiments, the matching engine may associate a measure of lead quality with any visitor-filter combination. In particular embodiments, the lead quality measure may be converted into a multiplier that adjusts the filter short-term net revenue up or down, depending on whether the visitor-filter lead quality is expected to improve or degrade the average lead quality for the lead buyer. The matching decisions may then be made using one of the methods described above, utilizing the lead quality adjusted short-term net revenue.

Alternatively, if the matching decisions are made using a linear program incorporating estimates of visitor volumes, then rather than adjusting the revenue coefficients, particular embodiments may add constraints to the linear program requiring that the average lead quality for each lead buyer achieve a lead-buyer-specific threshold. In this way, the lead seller can achieve the dual objectives of ensuring that a certain lead quality is obtained for each lead buyer while at the same time maximizing its own revenue.

In addition to help a lead seller maximize its short-term, medium-term, or long-term revenue, the results of the lead feedback analysis and other information may be used by a lead seller in selecting to which visitors to present the advertisements that may lead the visitors to the corresponding landing pages. Such information may enable the lead seller to manage the mix of visitors and ultimately the mix of forms submitted by the visitors to better leverage the lead-buyer filters and caps available at any given time.

When, where, and to whom a lead seller presents its advertisements may directly or indirectly affect the types of visitors the lead seller receives (the mix of visitors). For example, if the advertisements are presented to visitors located in a particular state, the visitors that may become leads are more likely to be from that state. If the advertisements are associated with certain search queries or keywords, the visitors that may become leads are more likely to be interested in the subject matters described by those search queries or keywords. Varying the advertising aspects thus may cause the types of the visitors to vary.

Often, in order to present advertisements to Internet visitors, a lead seller may need to purchase advertising spaces on the Internet from online publishers. An advertising space may be a space contained in an online medium (e.g., a web page, an email message, etc.) in which an advertisement may be placed for presentation to an Internet visitor. For example, online publishers such as Yahoo, Inc. and Google, Inc. sell advertising spaces in their web pages. Any party (e.g., a lead seller) wishing to advertise online may purchase such advertising spaces to place its advertisements so that they may be presented to the visitors when the web pages are presented to the visitors. Thus, which advertising spaces to purchase may affect to which visitors the advertisements are presented, which in turn may affect the mix of visitors who eventually become potential leads.

Particular embodiments may employ different approaches to managing the mix of visitors so as to best leverage the lead buyers' filters and caps. For example, a linear programming solution may be used. In particular embodiments, the values of the dual variables from the optimal solution to the linear program may provide insight into the value of obtaining additional volume of different visitor types given the currently anticipated visitor mix, which may help answer the question of which advertising spaces to purchase and how much to pay for certain advertising spaces. If large volume changes are contemplated, changing the volume constraints to reflect the proposed change may allow calculation of the change in profit margin. If the purchasing prices of the advertising spaces are fixed, particular embodiments may incorporate the number of advertising spaces to be purchased as additional decision variables in the linear program. In this case, the linear program solution may indicate how much volume of each type of advertising space to purchase at the given prices.

Particular embodiments may incorporate the advertising-space prices as additional decision variables in the linear program. In particular embodiments, certain parameters of the linear program may refer to traffic volumes, such as, for example and without limitation, the volumes of available advertising spaces, and it may be necessary to estimate the values of these parameters from historical data. The price-volume curves for each advertising space source may be estimated by using, for example, a log-log regression model, as previously mentioned. In this case, the linear program solution may indicate how much to pay for each type of advertising space. In the situation where some advertising spaces have fixed prices and some advertising spaces are auctioned (e.g., based on submitted bids), both the advertising-space volumes and the advertising-space prices may be incorporated as additional decision variables in the linear program.

In particular embodiments, the linear program solution may provide alerts when, for example, form submissions by visitors slows down or speeds up, mixing of the leads is changing, etc. In this way, the lead seller can take corrective steps so as to ensure that its advertising goals are achieved. Such steps might involve adjusting its purchases of advertising inventory, adjusting its advertising messaging and content, or adjusting the matching decisioning.

In particular embodiments, the results of analysis of the matching decisioning and the lead feedback may help a lead seller in negotiating sales of leads to the lead buyers and in managing lead-buyer filters in terms of eligibility requirements, price, and caps so as to best leverage the visitor mix and ultimately form submissions being generated through the digital marketing campaigns. In particular embodiments, again, a linear program solution may be used.

In particular embodiments, the dual variables from the linear program may provide insight into the value of obtaining additional cap of different filter groups given the current cap values. Sensitivity analysis around the optimal linear program solution may give insight into the value of relaxed filter rules or changes in filter prices. If large or multiple cap, filter rule or price, or target lead quality changes are contemplated, changing coefficients and constraint values to reflect the proposed changes allows calculation of the change in the lead seller's profit margin to understand the value that may be derived from the proposed changes.

Particular embodiments may incorporate the filter caps or some subset thereof as additional decision variables in the linear program and include penalties for caps that are not filled. The linear program solution may indicate which caps are most valuable to extend versus those current caps that are hardest to fill.

Particular embodiments may incorporate the filter prices or some subset thereof as additional decision variables in the linear program. In this case, the problem becomes a quadratic program because both price and volume are varying simultaneously. Lead quality constraints are required to constrain prices. The quadratic program solution may indicate which filter prices may be traded off against one another to maximize the lead seller's profit margin while achieving the lead-quality targets for the lead buyers.

Particular embodiments may define narrower and broader versions of filters, which equates to tightening or loosening filter eligibility requirements. Lead quality constraints may be required to ensure that the broader version of each filter is not always selected. The linear program solution indicates which filter eligibility requirements may be traded off against one another to maximize the lead seller's profit margin while achieving the lead-quality targets for the lead buyers.

Some of the approaches may be combined in situations where the lead seller wants to understand the interaction between caps, prices and eligibility requirements. Some approaches may require volume estimation. An additional benefit is to provide alerts if caps are pacing slow or fast or the mix of client matches is changing.

Particular embodiments may implement a "matcher simulator". Because of the complexity of the lead matching system, the impacts of any changes in the system (e.g., visitor mix, filter values or caps, lead quality, lead quality revenue adjustments or constraints, etc.) are difficult to understand and measure. In particular embodiments, the matcher simulator may simulate the operation of the system over a given timeframe (e.g., a day, a week, or a month), allowing the impacts of changes to the system to be explicitly measured in terms of multiple metrics, such as, without limitation, the number of leads delivered to and paid for by the lead buyers including lead types, matched filters, etc., the revenue generated, the number of forms submitted by the visitors, leads per form, revenue per lead, revenue per form, average lead quality per client, etc.

The matcher simulator may run previously collected visitor data (e.g., the previous month's data) through the matching engine. In particular embodiments, the matcher simulator may employ a discriminative model to model visitor response to presented filters. Discriminative models are a class of models used in machine learning for modeling the dependence of an unobserved variable on an observed variable. In the matcher simulator the observed variables are descriptors of the visitor profiles while the unobserved variables are the visitor responses to the presented filters. The discriminative model models the conditional probability distribution of the unobserved variable conditional on the unobserved variables. Parameters of this conditional distribution may be estimated from the previously collected visitor data. Alternatively, in further embodiments, the matcher simulator may employ a generative model to randomly create visitor profiles, responses, and selections. A generative model is a model for randomly generating observable data. In the matcher simulator, a generative model draws both the visitor profiles and the responses of those visitors to presented filters from probability distributions. Parameters of the probability distributions may be estimated from the previously collected visitor data.

The matcher simulator may run against various instantiations of the matching engine, in particular allowing the impacts of changes in filter caps, prices, and eligibility requirements to be explicitly captured. For example, the matcher simulator may run with different filters, different visitor attributes, different caps, different filter values, etc. to show how these changes may affect the short-term, medium-term, or long-term revenue for the lead seller. Multiple metrics may be measured (e.g., number of leads delivered by client, type, filter, etc., revenue generated, number of forms, leads per form, revenue per lead, revenue per form, average lead quality per client, etc.). The metrics may be aggregated over the time period or the profiles may be examined, for example, in online education vertical, to understand likely declines in revenue per form over the course of a month as filter caps are hit.

In particular embodiments, the visitors may be dynamically matched to lead buyers based on their answers to one or more so-called "splitting" questions presented to the visitors in the forms contained in the landing pages. Such matching method may be especially suitable to certain business industries. Consider an example from the auto insurance vertical. Suppose there are two different lead buyers: lead-buyer A buys leads (e.g., visitors who have completed the entire form); and lead-buyer B buys what are effectively clicks. For example, a splitting question appropriate for the auto insurance lead buyers presented to the visitors may be "Do you currently have auto insurance?" If a visitor responds "no", then the matching engine may automatically match him to lead-buyer B (e.g., by redirecting the visitor to lead-buyer B's website) without requiring that he completes the rest of the form and answers all the remaining questions. On the other hand, if a visitor responds "yes", then the visitor needs to complete the form and answer the remaining questions. Suppose the visitor completes and submits the form, the visitor may be matched to lead-buyer A.

In this type of situation, one concern may be where in the form to place the splitting question. In the above example, if the splitting question is placed earlier in the form, then more visitors may be directed to lead-buyer B, although the number of visitors being matched to lead-buyer A is likely not to be impacted. However, the revenue per click that lead buyer B pays to the lead seller is dependent on the quality of the traffic that the lead seller directs to lead buyer B. That is, lead buyer B may pay the lead seller more for higher quality traffic. The traffic that the lead seller sends to lead-buyer B when the splitting question is placed later in the form may likely be of a higher quality than the traffic that the lead seller sends to lead-buyer B when the splitting question is placed earlier in the form because the visitors have demonstrated more commitment to the product by answering more questions before reaching the splitting question. The trade-off between the number of visitors directed to lead-buyer B and the revenue per visitor that lead-buyer B pays to the lead seller may be complicated to understand. Particular embodiments may address this problem by presenting alternative instances of the landing page to different visitors (e.g., one landing page with the splitting question placed earlier in the form, and another landing page with the splitting question placed later in the form) and allocate the different instances of the landing pages to different visitors based on one or more statistical-based analyses.

Once the matching engine has selected one or more of the lead buyers to whom the visitor has been matched, the matching engine may forward the visitor's information to these selected lead buyers so that the visitor becomes a lead for these selected lead buyers, as illustrated in step 250.

Figure 3:
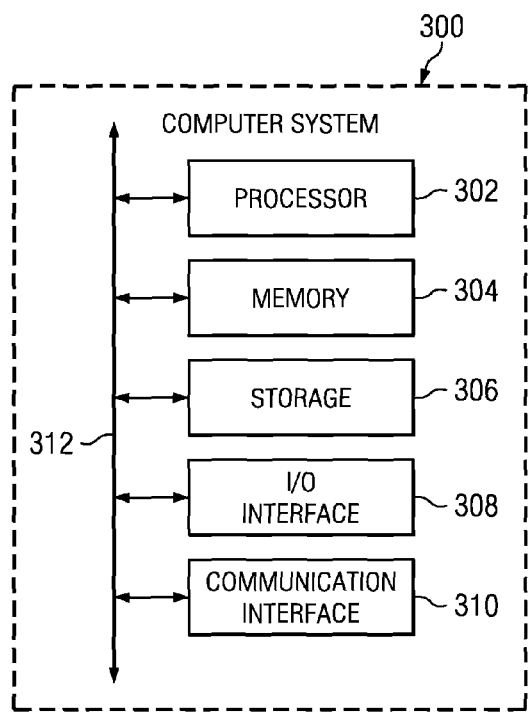
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. The present disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. The present disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be maskprogrammed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
accessing, by one or more computer systems, information regarding a visitor to a website;
accessing, by the one or more computer systems, a plurality of filters, each of the filters being associated with one of a plurality of lead buyers and being defined by a set of lead criteria specified by the associated lead buyer;
selecting, by the one or more computer systems, at least one of the filters for which the visitor qualifies as a lead, comprising:
for each of the filters:
determining, by the one or more computer systems, whether the information regarding the visitor satisfies the set of lead criteria defining the filter; and
when the information regarding the visitor satisfies the set of lead criteria defining the filter, selecting, by the one or more computer systems, the filter as a filter for which the visitor qualifies as a lead;
for each of the filters for which the visitor qualifies as a lead, accessing, by the one or more computer systems, information indicating a potential revenue to be obtained by a lead matcher from the lead buyer associated with the filter, the potential revenue being computed using at least:
a filter value for the filter representing an amount per lead generated from the filter to be paid by the lead buyer associated with the filter to the lead matcher;
a match-sent ratio for the filter representing a proportion of visitors matched to the filter actually sold as leads to the lead buyer associated with the filter by the lead matcher;
a reject-lead rate for the filter representing a proportion of visitors offered by the lead matcher for sale as leads to the lead buyer associated with the filter whom the lead buyer rejects; and
a return-lead rate for the filter representing a proportion of visitors whom the lead buyer associated with the filter buys as leads from the lead matcher but later returns;
comparing, by the one or more computer systems, the potential revenues to be obtained by the lead matcher from the lead buyers associated with the filters for which the visitor qualifies as a lead with each other; and
based on the comparison, selecting, by the one or more computer systems, one or more particular ones of the filters for which the visitor qualifies as a lead as filters to which to match the visitor.

2. The method of claim 1, wherein for each of the filters, the match-sent ratio, the reject-lead rate, and the return-lead rate are estimated based on one or more statistical models.

3. The method of claim 2, wherein, for each of the filters:
the statistical models estimating the match-sent ratio employ a Bayesian credibility or hierarchical Bayes approach or a discrete choice model; and
the statistical models estimating the reject-lead rate and the return-lead rate are one or more feature-based statistical models.

4. The method of claim 1, wherein the potential revenue to be obtained by the lead matcher from the lead buyer associated with a filter for which the visitor qualifies as a lead is further based on the maximum number of leads that the lead buyer has committed to buy over a particular time period.

5. The method of claim 1, wherein the potential revenue to be obtained by the lead matcher from the lead buyer associated with a filter for which the visitor qualifies as a lead is further based on a quality of the visitors previously sold to the lead buyer as leads.

6. The method of claim 1, wherein the information regarding the visitor comprises information associated with the visitor or information submitted by the visitor via one or more web pages of the website.

7. The method of claim 6, further comprising presenting an advertisement to the visitor, wherein the information regarding the visitor further comprises the advertisement presented to the visitor.

8. The method of claim 1, further comprising selling some or all of the information regarding the visitor as a lead to the one or more lead buyers associated with the filters to which the visitor has been matched.

9. The system of claim 8, further comprising transmitting the information regarding the visitor to the lead buyers to whom the lead is being sold.

10. The method of claim 1, further comprising, for each of the filters to which the visitor is matched:
presenting the filter to the visitor by identifying on a web page of the website the lead buyer associated with the filter;
soliciting information from the visitor concerning the visitor's level of interest in the filter presented to the visitor; and
receiving information from the visitor concerning the visitor's level of interest in the filter presented to the visitor.

11. The method of claim 10, further comprising selling some or all of the information regarding the visitor as a lead to the one or more lead buyers associated with the filters to which the visitor has been matched and which the visitor has selected.

12. The method of claim 11, further comprising transmitting the information regarding the visitor to the lead buyers to whom the lead is being sold.

13. A system comprising:
a memory comprising instructions executable by one or more processors; and
one or more processors coupled to the memory and operable to execute the instructions, the one or more processors being operable when executing the instructions to:
access information regarding a visitor to a website;
access a plurality of filters, each of the filters being associated with one of a plurality of lead buyers and being defined by a set of lead criteria specified by the associated lead buyer;
select at least one of the filters for which the visitor qualifies as a lead, comprising:
for each of the filters:
determine whether the information regarding the visitor satisfies the set of lead criteria defining the filter; and
when the information regarding the visitor satisfies the set of lead criteria defining the filter, select the filter as a filter for which the visitor qualifies as a lead;
for each of the filters for which the visitor qualifies as a lead, access information indicating a potential revenue to be obtained by a lead matcher from the lead buyer associated with the filter, the potential revenue being computed using at least:
  a filter value for the filter representing an amount per lead generated from the filter to be paid by the lead buyer associated with the filter to the lead matcher;
  a match-sent ratio for the filter representing a proportion of visitors matched to the filter actually sold as leads to the lead buyer associated with the filter by the lead matcher;
  a reject-lead rate for the filter representing a proportion of visitors offered by the lead matcher for sale as leads to the lead buyer associated with the filter whom the lead buyer rejects; and
  a return-lead rate for the filter representing a proportion of visitors whom the lead buyer associated with the filter buys as leads from the lead matcher but later returns;
compare the potential revenues to be obtained by the lead matcher from the lead buyers associated with the filters for which the visitor qualifies as a lead with each other; and
based on the comparison, select one or more particular ones of the filters for which the visitor qualifies as a lead as filters to which to match the visitor.

14. The system of claim 13, wherein for each of the filters, the match-sent ratio, the reject-lead rate, and the return-lead rate are estimated based on one or more statistical models.

15. The system of claim 14, wherein, for each of the filters:
the statistical models estimating the match-sent ratio employ a Bayesian credibility or hierarchical Bayes approach or a discrete choice model; and
the statistical models estimating the reject-lead rate and the return-lead rate are one or more feature-based statistical models.

16. The system of claim 13, wherein the potential revenue to be obtained by the lead matcher from the lead buyer associated with a filter for which the visitor qualifies as a lead is further based on the maximum number of leads that the lead buyer has committed to buy over a particular time period.

17. The system of claim 13, wherein the potential revenue to be obtained by the lead matcher from the lead buyer associated with a filter for which the visitor qualifies as a lead is further based on a quality of the visitors previously sold to the lead buyer as leads.

18. The system of claim 13, wherein the information regarding the visitor comprises information associated with the visitor or information submitted by the visitor via one or more web pages of the website.

19. The system of claim 18, wherein the processors are further operable when executing the instructions to present an advertisement to the visitor, wherein the information regarding the visitor further comprises the advertisement presented to the visitor.

20. The system of claim 13, wherein the processors are further operable when executing the instructions to sell some or all of the information regarding the visitor as a lead to the one or more lead buyers associated with the filters to which the visitor has been matched.

21. The system of claim 20, wherein the processors are further operable when executing the instructions to transmit the information regarding the visitor to the lead buyers to whom the lead is being sold.

22. The system of claim 13, wherein the processors are further operable when executing the instructions, for each of the filters to which the visitor is matched, to:
  present the filter to the visitor by identifying on a web page of the website the lead buyer associated with the filter;
  solicit information from the visitor concerning the visitor's level of interest in the filter presented to the visitor; and
  receive information from the visitor concerning the visitor's level of interest in the filter presented to the visitor.

23. The system of claim 22, wherein the processors are further operable when executing the instructions to sell some or all of the information regarding the visitor as a lead to the one or more lead buyers associated with the filters to which the visitor has been matched and which the visitor has selected.

24. The system of claim 23, wherein the processors are further operable when executing the instructions to transmit the information regarding the visitor to the lead buyers to whom the lead is being sold.

25. One or more computer-readable storage media possessing structure and embodying software that is operable when executed by one or more computer systems to:
access information regarding a visitor to a website;
access a plurality of filters, each of the filters being associated with one of a plurality of lead buyers and being defined by a set of lead criteria specified by the associated lead buyer;
select at least one of the filters for which the visitor qualifies as a lead, comprising:
  for each of the filters:
    determine whether the information regarding the visitor satisfies the set of lead criteria defining the filter; and
    when the information regarding the visitor satisfies the set of lead criteria defining the filter, select the filter as a filter for which the visitor qualifies as a lead;
for each of the filters for which the visitor qualifies as a lead, access information indicating a potential revenue to be obtained by a lead matcher from the lead buyer associated with the filter, the potential revenue being computed using at least:
  a filter value for the filter representing an amount per lead generated from the filter to be paid by the lead buyer associated with the filter to the lead matcher;
  a match-sent ratio for the filter representing a proportion of visitors matched to the filter actually sold as leads to the lead buyer associated with the filter by the lead matcher;
  a reject-lead rate for the filter representing a proportion of visitors offered by the lead matcher for sale as leads to the lead buyer associated with the filter whom the lead buyer rejects; and
  a return-lead rate for the filter representing a proportion of visitors whom the lead buyer associated with the filter buys as leads from the lead matcher but later returns;
compare the potential revenues to be obtained by the lead matcher from the lead buyers associated with the filters for which the visitor qualifies as a lead with each other; and
based on the comparison, select one or more particular ones of the filters for which the visitor qualifies as a lead as filters to which to match the visitor.

26. The media of claim 25, wherein for each of the filters, the match-sent ratio, the reject-lead rate, and the return-lead rate are estimated based on one or more statistical models.

27. The media of claim 26, wherein, for each of the filters:
the statistical models estimating the match-sent ratio employ a Bayesian credibility or hierarchical Bayes approach or a discrete choice model; and the statistical models estimating the reject-lead rate and the return-lead rate are one or more feature-based statistical models.

28. The media of claim 25, wherein the potential revenue to be obtained by the lead matcher from the lead buyer associated with a filter for which the visitor qualifies as a lead is further based on the maximum number of leads that the lead buyer has committed to buy over a particular time period.

29. The media of claim 25, wherein the potential revenue to be obtained by the lead matcher from the lead buyer associated with a filter for which the visitor qualifies as a lead is further based on a quality of the visitors previously sold to the lead buyer as leads.

30. The media of claim 25, wherein the information regarding the visitor comprises information associated with the visitor or information submitted by the visitor via one or more web pages of the website.

31. The media of claim 30, wherein the software is further operable to present an advertisement to the visitor, wherein the information regarding the visitor further comprises the advertisement presented to the visitor.

32. The media of claim 25, wherein the software is further operable to sell some or all of the information regarding the visitor as a lead to the one or more lead buyers associated with the filters to which the visitor has been matched.

33. The media of claim 32, wherein the software is further operable to transmit the information regarding the visitor to the lead buyers to whom the lead is being sold.

34. The media of claim 25, wherein the software is further operable, for each of the filters to which the visitor is matched, to:
   present the filter to the visitor by identifying on a web page of the website the lead buyer associated with the filter;
   solicit information from the visitor concerning the visitor's level of interest in the filter presented to the visitor; and
   receive information from the visitor concerning the visitor's level of interest in the filter presented to the visitor.

35. The media of claim 34, wherein the software is further operable to sell some or all of the information regarding the visitor as a lead to the one or more lead buyers associated with the filters to which the visitor has been matched and which the visitor has selected.

36. The media of claim 35, wherein the software is further operable to transmit the information regarding the visitor to the lead buyers to whom the lead is being sold.

37. A system comprising:
   means for accessing information regarding a visitor to a website;
   means for accessing a plurality of filters, each of the filters being associated with one of a plurality of lead buyers and being defined by a set of lead criteria specified by the associated lead buyer;
   means for, for each of the filters:
      determining whether the information regarding the visitor satisfies the set of lead criteria defining the filter; and
      when the information regarding the visitor satisfies the set of lead criteria defining the filter, selecting the filter as a filter for which the visitor qualifies as a lead; and
   means for, for each of the filters for which the visitor qualifies as a lead, accessing information indicating a potential revenue to be obtained by a lead matcher from the lead buyer associated with the filter, the potential revenue being computed using at least:
      a filter value for the filter representing an amount per lead generated from the filter to be paid by the lead buyer associated with the filter to the lead matcher;
      a match-sent ratio for the filter representing a proportion of visitors matched to the filter actually sold as leads to the lead buyer associated with the filter by the lead matcher;
      a reject-lead rate for the filter representing a proportion of visitors offered by the lead matcher for sale as leads to the lead buyer associated with the filter whom the lead buyer rejects; and
      a return-lead rate for the filter representing a proportion of visitors whom the lead buyer associated with the filter buys as leads from the lead matcher but later returns;
   means for comparing the potential revenues to be obtained by the lead matcher from the lead buyers associated with the filters for which the visitor qualifies as a lead with each other; and
   means for, based on the comparison, selecting one or more particular ones of the filters for which the visitor qualifies as a lead as filters to which to match the visitor.

* * * * *